US012695149B2

(12) United States Patent
Park et al.

(10) Patent No.: US 12,695,149 B2
(45) Date of Patent: Jul. 28, 2026

(54) BATTERY PACK

(71) Applicant: SAMSUNG SDI CO., LTD., Yongin-si (KR)

(72) Inventors: Shidong Park, Yongin-si (KR); Jangwoong Bae, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 714 days.

(21) Appl. No.: 17/750,555

(22) Filed: May 23, 2022

(65) Prior Publication Data

US 2022/0376346 A1      Nov. 24, 2022

(30) Foreign Application Priority Data

May 24, 2021     (KR) ........................ 10-2021-0066487

(51) Int. Cl.
*H01M 50/271* (2021.01)
*H01M 50/209* (2021.01)
*H01M 50/505* (2021.01)

(52) U.S. Cl.
CPC ....... *H01M 50/271* (2021.01); *H01M 50/209* (2021.01); *H01M 50/505* (2021.01)

(58) Field of Classification Search
CPC ............. H01M 50/588; H01M 50/584; H01M 50/586; H01M 50/59; H01M 50/591; H01M 50/555
See application file for complete search history.

(56) References Cited

U.S. PATENT DOCUMENTS

| | | | |
|---|---|---|---|
| 9,028,996 B2 | 5/2015 | Yoshioka et al. | |
| 10,632,848 B2 | 4/2020 | Lee et al. | |
| 10,790,550 B2 | 9/2020 | Kwon et al. | |
| 10,985,432 B2 | 4/2021 | Lee | |

(Continued)

FOREIGN PATENT DOCUMENTS

| | | |
|---|---|---|
| CN | 102356504 A | 2/2012 |
| CN | 107528020 A | 12/2017 |

(Continued)

OTHER PUBLICATIONS

Chinese Office Action dated Dec. 30, 2023, of the corresponding CN Patent Application No. 202210570820.9.
European Search Report dated Oct. 26, 2022.

*Primary Examiner* — Helen Oi K Conley
*Assistant Examiner* — Amanda Rosenbaum
(74) *Attorney, Agent, or Firm* — Lee IP Law, P.C.

(57) ABSTRACT

A battery pack includes battery cells arranged in a first direction, the battery cells each having a main surface, a first surface, and a second surface, main surfaces of battery cells that are adjacent to each other facing each other, and the first surface and the second surface respectively forming both ends of each of the battery cells in a second direction intersecting with the first direction; an insulating cap on the first surface and the second surface of the battery cell, the insulating cap extending from the first surface and the second surface onto a portion of the main surface of the battery cell and insulating the main surfaces of the battery cells adjacent to each other in the first direction; a bus bar on the insulating cap and electrically connecting the battery cells to each other; and a binding frame structurally binding the battery cells to each other.

21 Claims, 9 Drawing Sheets

(56)                References Cited

U.S. PATENT DOCUMENTS

| | | | |
|---|---|---|---|
| 11,830,974 B2 | 11/2023 | Jin et al. | |
| 2007/0287063 A1* | 12/2007 | Hiratsuka | H01M 50/28 |
| | | | 29/623.2 |
| 2008/0003498 A1* | 1/2008 | Yasuda | H01G 9/08 |
| | | | 429/177 |
| 2010/0021802 A1* | 1/2010 | Yang | H01M 50/557 |
| | | | 429/159 |
| 2010/0151281 A1* | 6/2010 | Kwag | H01M 10/0436 |
| | | | 429/7 |
| 2011/0039134 A1* | 2/2011 | Kim | H01M 10/637 |
| | | | 429/7 |
| 2011/0070474 A1 | 3/2011 | Lee et al. | |
| 2011/0262778 A1* | 10/2011 | Yoon | H01M 50/147 |
| | | | 429/7 |
| 2012/0156537 A1 | 6/2012 | Meintschel et al. | |
| 2015/0037634 A1* | 2/2015 | Malcolm | H05K 1/18 |
| | | | 429/90 |
| 2016/0126531 A1* | 5/2016 | Kim | H01M 10/6554 |
| | | | 429/7 |
| 2016/0141591 A1* | 5/2016 | Lee | H01M 50/548 |
| | | | 429/179 |
| 2016/0233465 A1* | 8/2016 | Lee | H01M 10/625 |
| 2017/0187017 A1 | 6/2017 | Zhang et al. | |
| 2018/0123159 A1 | 5/2018 | Kim | |
| 2020/0036049 A1* | 1/2020 | Lee | H01M 50/211 |
| 2020/0176745 A1 | 6/2020 | Lee | |
| 2020/0203698 A1 | 6/2020 | Jin et al. | |
| 2020/0321570 A1* | 10/2020 | Motohashi | H01M 10/425 |

FOREIGN PATENT DOCUMENTS

| | | | | |
|---|---|---|---|---|
| CN | 111164790 A | 5/2020 | | |
| EP | 3024054 A1 | 5/2016 | | |
| EP | 3261154 A1 | 12/2017 | | |
| EP | 3671937 A1 | 6/2020 | | |
| JP | 6079097 | 1/2017 | | |
| KR | 10-2006-0085775 A | 7/2006 | | |
| KR | 10-2014-0068326 A | 6/2014 | | |
| KR | 10-2016-0016517 A | 2/2016 | | |
| KR | 10-2018-0048030 | 5/2018 | | |
| KR | 10-1918691 | 11/2018 | | |
| KR | 10-2018-0136176 A | 12/2018 | | |
| KR | 10-2159347 | 9/2020 | | |
| WO | WO 2010/081704 A2 | 7/2010 | | |
| WO | WO-2014084474 A1 * | 6/2014 | | H01M 50/502 |
| WO | WO 2019/098588 A1 | 5/2019 | | |

* cited by examiner

BATTERY PACK

CROSS-REFERENCE TO RELATED APPLICATION

This application is based on and claims priority under 35 U.S.C. § 119 to Korean Patent Application No. 10-2021-0066487, filed on May 24, 2021, in the Korean Intellectual Property Office, the disclosure of which is incorporated by reference herein in its entirety.

BACKGROUND

1. Field

Embodiments relate to a battery pack.

2. Description of the Related Art

In general, secondary batteries refer to batteries that can be repeatedly charged and recharged, unlike non-rechargeable primary batteries. Secondary batteries may be used as energy sources of devices such as mobile devices, electric vehicles, hybrid electric vehicles, electric bicycles, and uninterruptible power supplies. Single-cell secondary batteries or a module form of secondary batteries each including a plurality of cells connected to each other as a unit may be used according to the types of devices that employ secondary batteries.

SUMMARY

The embodiments may be realized by providing a battery pack including a plurality of battery cells arranged in a first direction, each battery cell of the plurality of battery cells having a main surface, a first surface, and a second surface, respective main surfaces of battery cells that are adjacent to each other facing each other, and the first surface and the second surface respectively forming both ends of each of the plurality of battery cells in a second direction intersecting with the first direction; an insulating cap on the first surface and the second surface of each battery cell, the insulating cap extending from the first surface and the second surface onto a portion of the main surface of each battery cell and insulating the main surfaces of battery cells adjacent to each other in the first direction; a bus bar on the insulating cap and electrically connecting the plurality of battery cells to each other; and a binding frame configured to structurally bind the plurality of battery cells to each other.

The insulating cap may be individually provided on each battery cell of the plurality of battery cells arranged in the first direction.

The main surface of each battery cell may connect between the first surface and the second surface of each battery cell and includes a surface having a first area, and each battery cell may further include a side surface connecting between the first surface and the second surface and having a second area, the second area being smaller than the first area.

Each of the main surface and the side surface of each battery cell may have an elongated shape extending lengthwise in the second direction.

The insulating cap may include a base portion on the first surface or the second surface of a corresponding battery cell; a long-side portion extending from the base portion onto the main surface of the corresponding battery cell; and a short-side portion extending from the base portion onto the side surface of the corresponding battery cell.

The long-side portion and the short-side portion may continuously surround edges of the first surface or the second surface of the corresponding battery cell.

The main surface and the side surface of each battery cell may respectively include a pair of main surfaces and a pair of side surfaces, the pair of main surfaces and the pair of side surfaces may be arranged to face each other, respectively, and the main surface and the side surface of each battery cell may be outer surfaces of a hollow case of each battery cell and are continuously connected to each other.

Each of the hollow cases may include a first opening and a second opening respectively at both ends of the hollow case, each hollow case being formed by cutting of a hollow member continuously extruded in the second direction.

Each battery cell may include a first board and a second board respectively coupled at both ends of the hollow case, the first board may seal the first opening of the hollow case, and the second board may seal the second opening of the hollow case.

A thickness of the hollow case may be greater than a thickness of the first board and greater a thickness of the second board.

The first surface and the second surface of the battery cell may be outer surfaces of the first board and the second board, respectively.

Each battery cell may include an electrode connected to the bus bar, and the electrode of each battery cell may include a first electrode and a second electrode respectively protruding from the first surface and the second surface of each battery cell.

Each insulating cap may include an electrode hole exposing the electrode of a corresponding battery cell; and a bus bar guide configured to guide a position of the bus bar around the electrode hole.

Each insulating cap may further include at least one fixing piece at an edge position thereof in a third direction intersecting with the first direction and the second direction, and the electrode hole may be at a central position of each insulating cap in the third direction.

The at least one fixing piece may include a plurality of fixing pieces arranged in the first direction to correspond to the plurality of battery cells, and the binding frame may be coupled to each of the plurality of fixing pieces while extending in the first direction.

The binding frame may extend in the first direction and includes a first portion and a second portion bent with respect to each other, the first portion may include a coupling position coupled with the at least one fixing piece, and the second portion may be bent from the first portion and protrudes toward the outside of the battery cell in the second direction.

The at least one fixing piece may be integrally formed with a body of the insulating cap through insert injection molding.

Each insulating cap may further include, together with the electrode hole, a bonding area at the central position thereof.

The electrode hole and the bonding area of the insulating cap may be at different positions at the central position of each insulating cap.

The at least one fixing piece of each insulating cap may include a first fixing piece and a second fixing piece respectively at edge positions at both sides of each insulating cap in the third direction, the electrode hole and the bonding area of each insulating cap may be between the first fixing piece and the second fixing piece, the electrode hole may be at a position that is relatively closer to the first fixing piece, and the bonding area may be at a position that is relatively closer to the second fixing piece.

The bus bar may be at a position of the electrode hole of each insulating cap, the binding frame may be at a position of the at least one fixing piece of each insulating cap, and the battery pack may further include a circuit unit on the bus bar and the binding frame, the circuit unit being connected to the bus bar.

BRIEF DESCRIPTION OF THE DRAWINGS

Features will be apparent to those of skill in the art by describing in detail exemplary embodiments with reference to the attached drawings in which:

FIGS. 2A and 2B are exploded perspective views of the battery pack shown in FIG. 1, wherein FIGS. 2A and 2B illustrate different exploded perspective views from each other;

FIGS. 5A and 5B are exploded perspective views of a portion of the battery pack shown in FIG. 1, wherein FIGS. 5A and 5B illustrate different exploded perspective views from each other.

DETAILED DESCRIPTION

Figure 1:
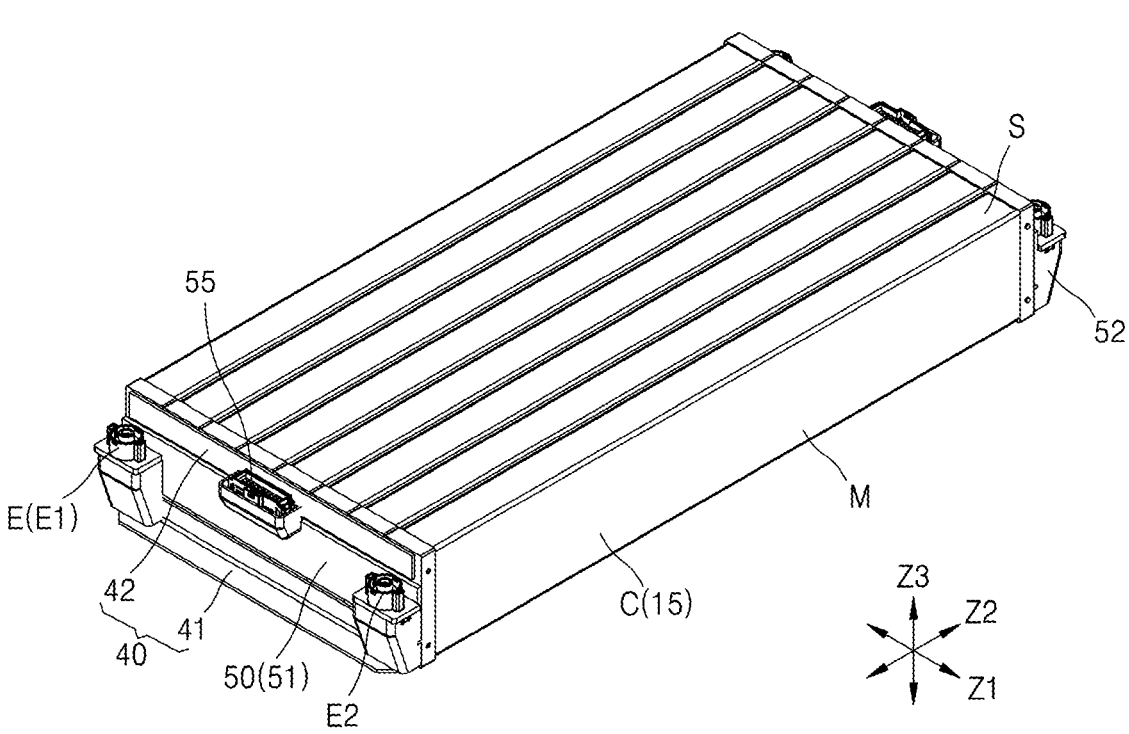
FIG. 1 is a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items, e.g., "A or B" would include A, B, or A and B. Expressions such as "at least one of," when preceding a list of elements, modify the entire list of elements and do not modify the individual elements of the list.

Hereinafter, a battery pack will be described according to embodiments with reference to the accompanying drawings.

Figure 2A:
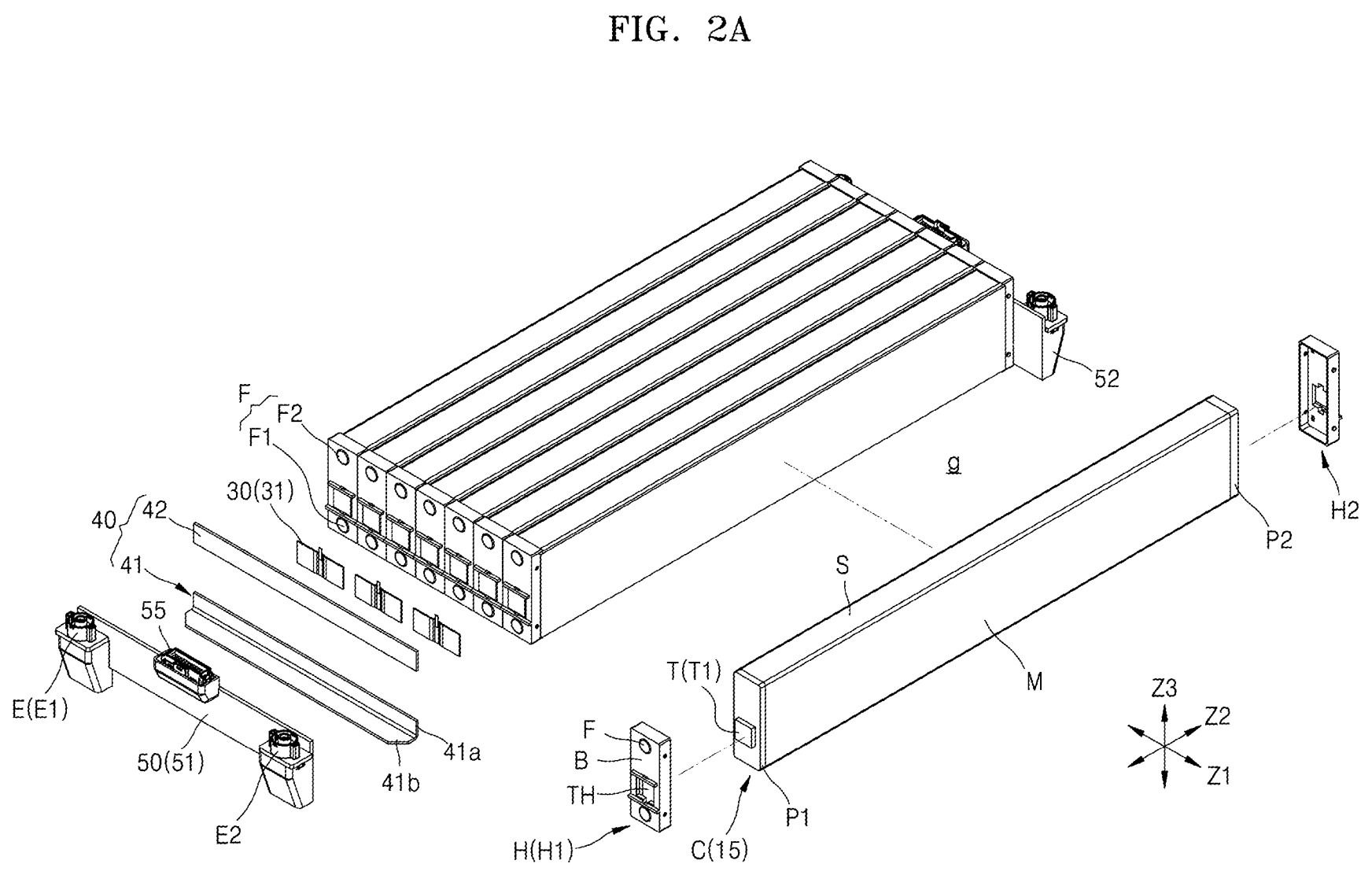
Figure 2B:
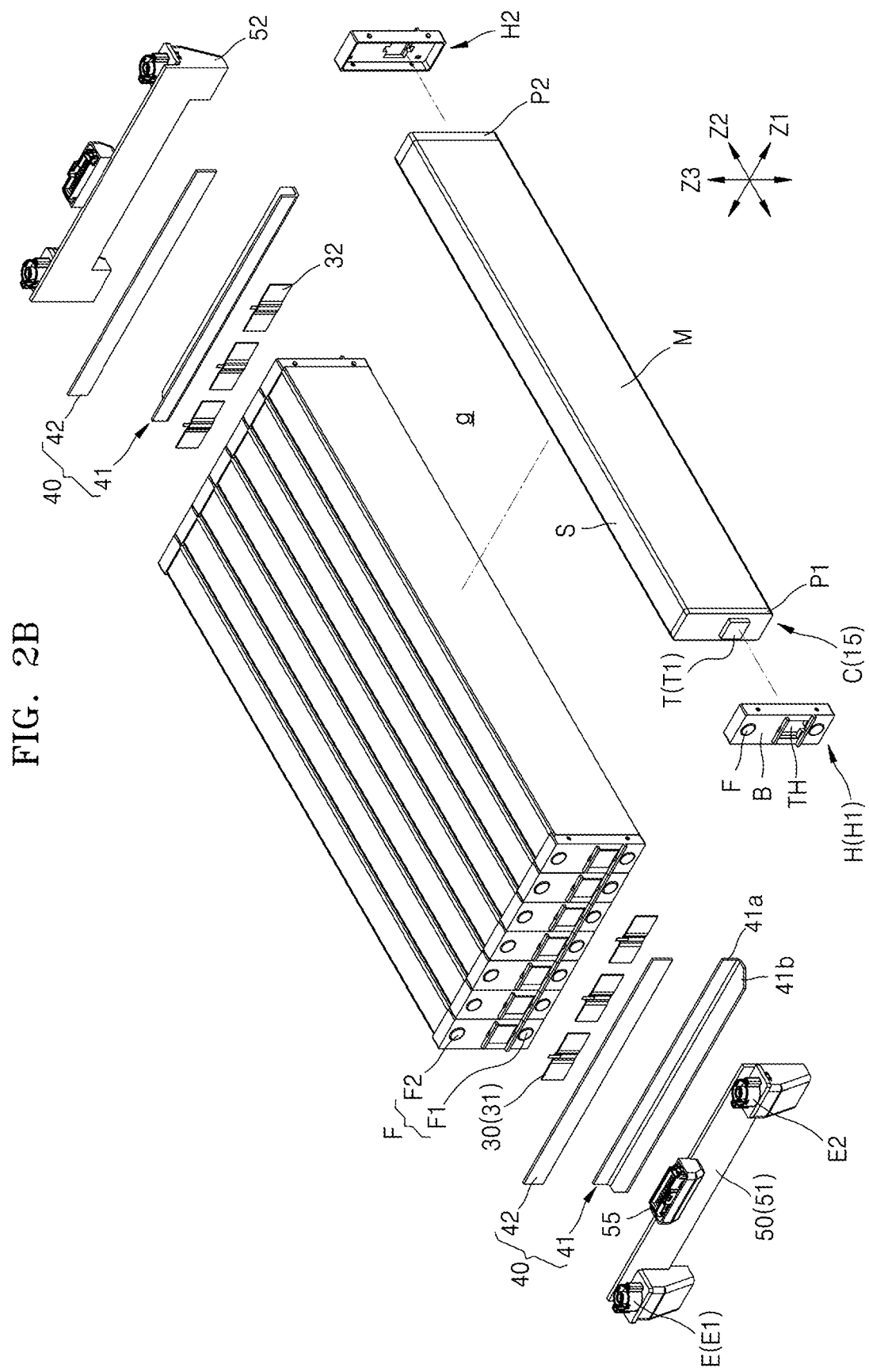
Figure 3:
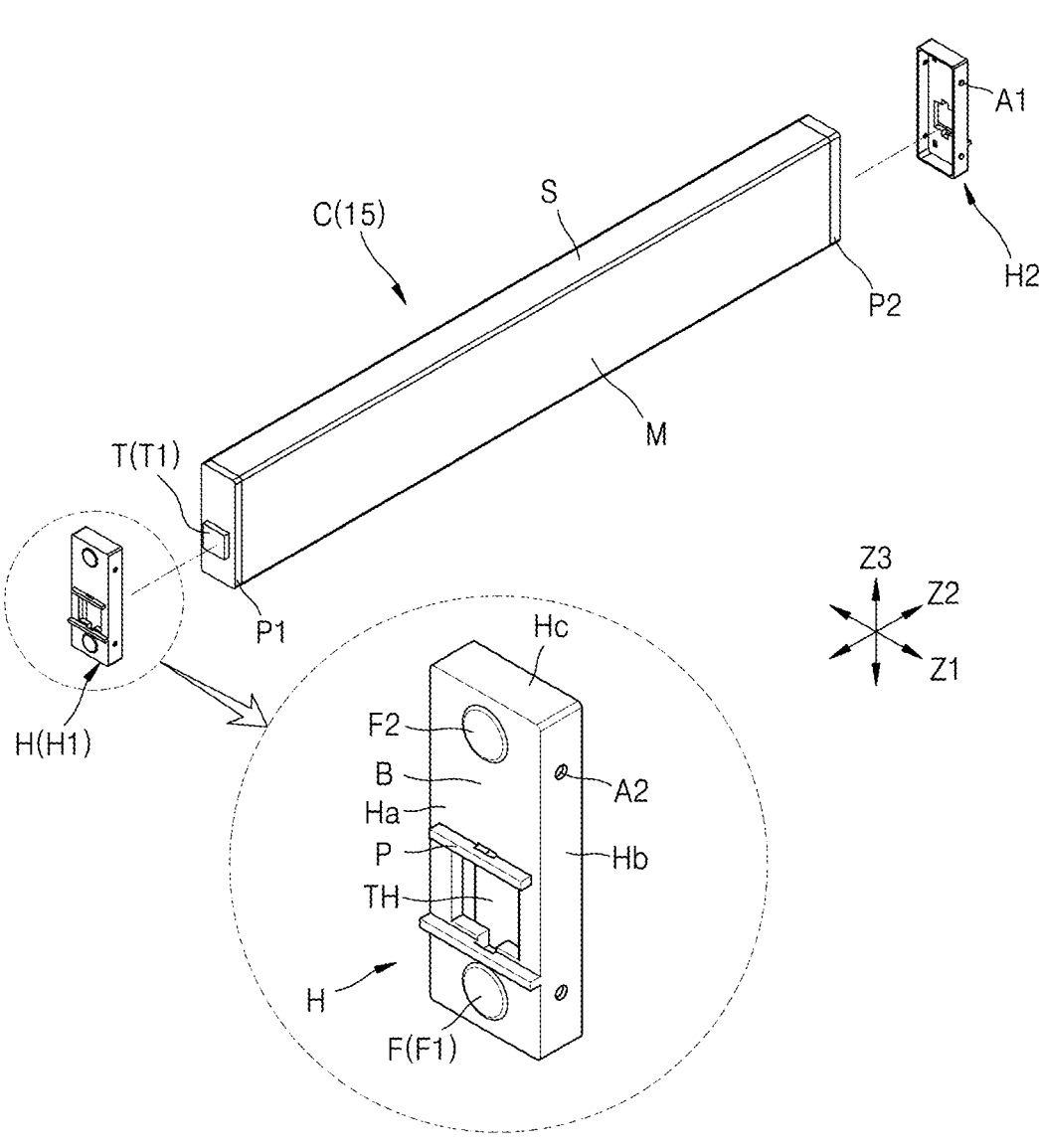
FIG. 3 is an exploded perspective view of the assembly of a battery cell and an insulating cap shown in FIG. 1.
Figure 4:
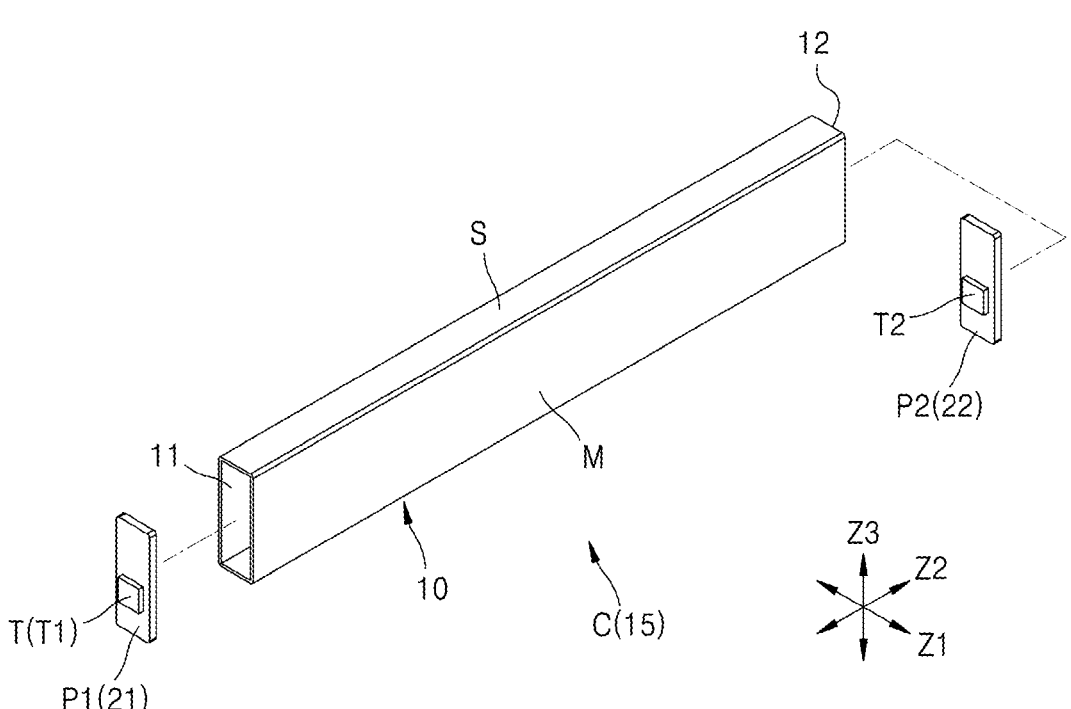
FIG. 4 is an exploded perspective view of a battery cell shown in FIG. 3.
Figure 5A:
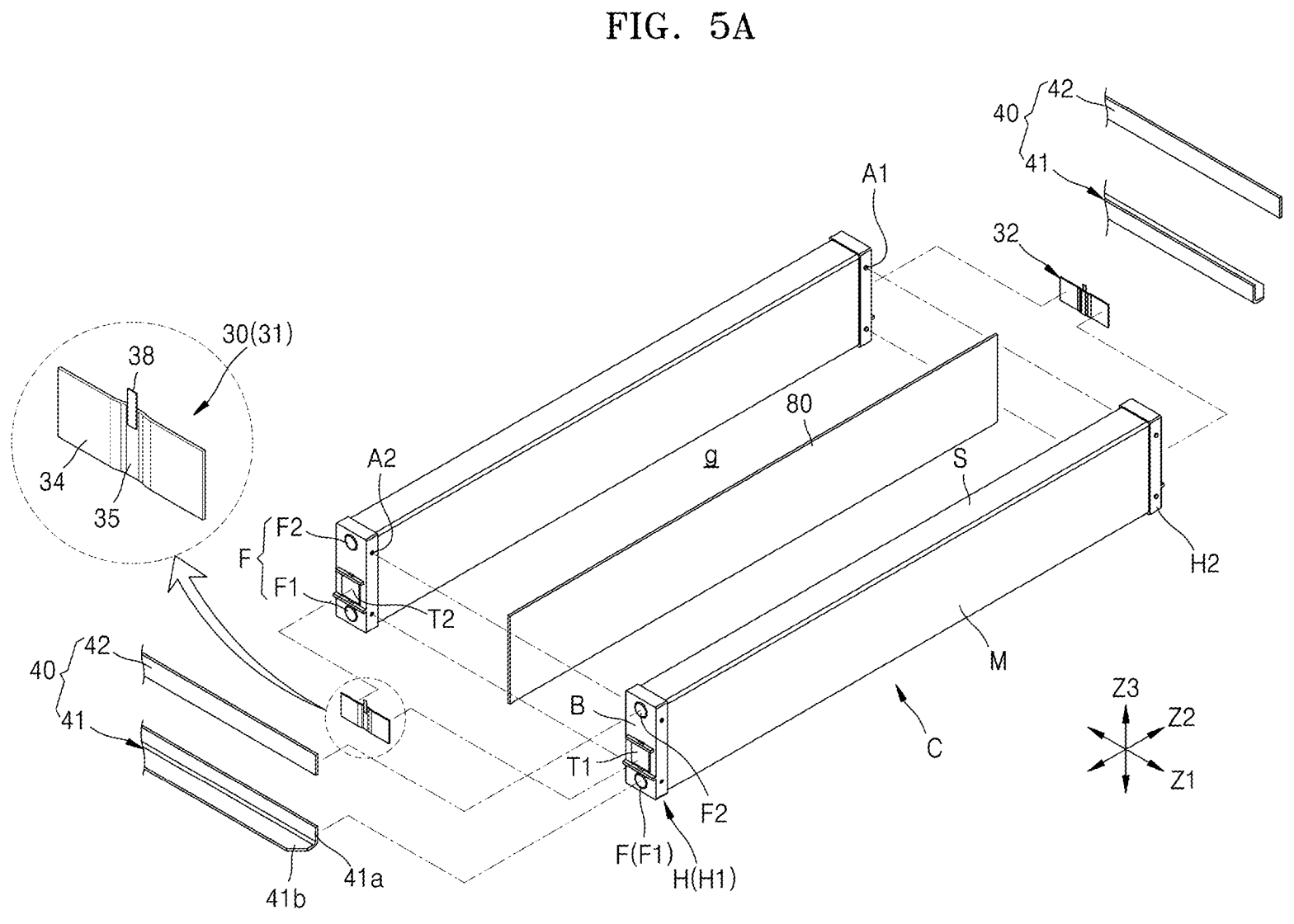
Figure 5B:
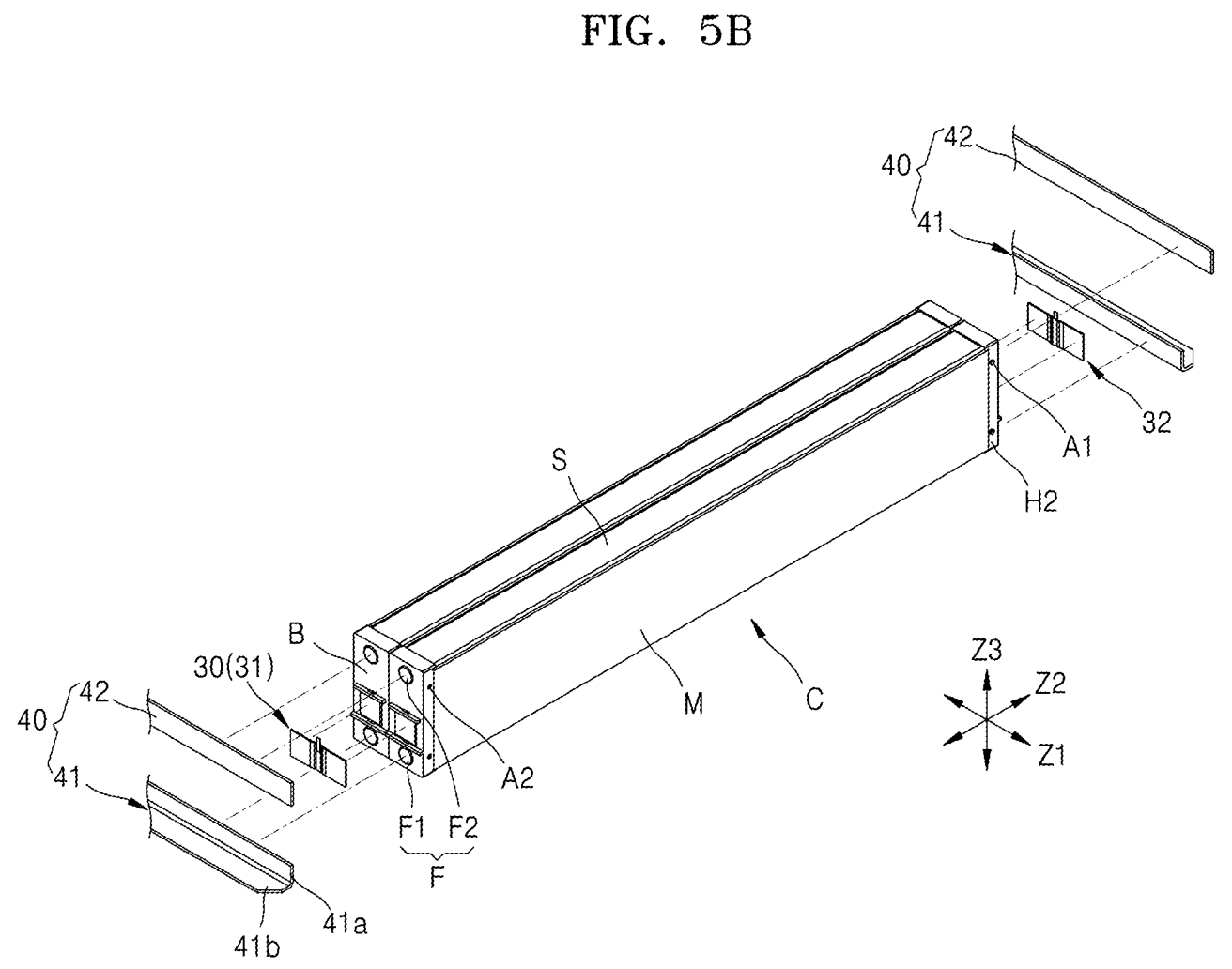
Figure 6A:
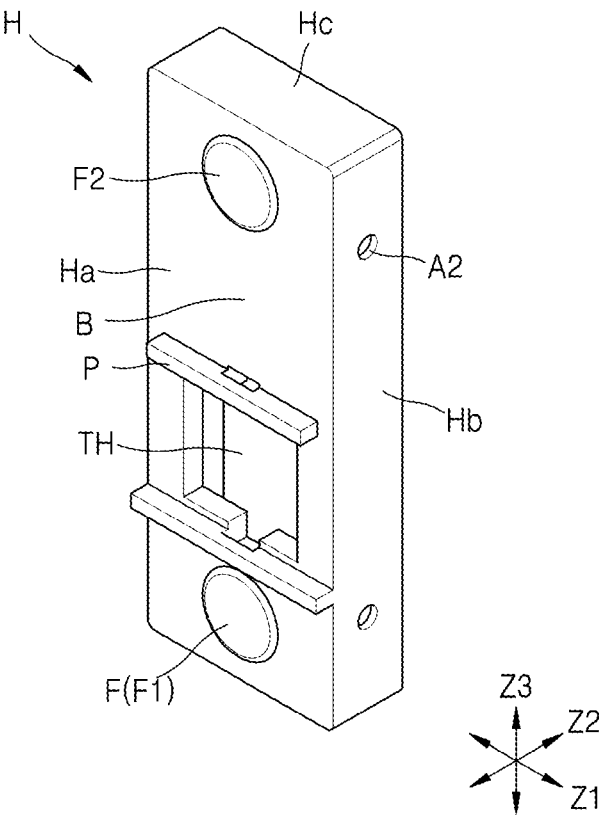
FIGS. 6A and 6B are different perspective views of an insulating cap shown in FIG. 1.
Figure 6B:
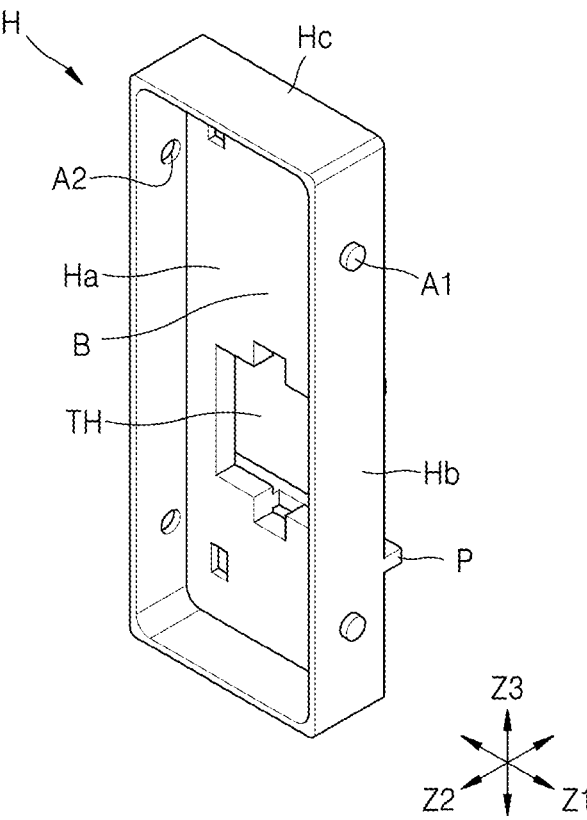

FIG. 1 is a perspective view of a battery pack according to an embodiment. FIGS. 2A and 2B are exploded perspective views of the battery pack shown in FIG. 1, wherein FIGS. 2A and 2B illustrate different exploded perspective views from each other. FIG. 3 is an exploded perspective view of the assembly of a battery cell and an insulating cap shown in FIG. 1. FIG. 4 is an exploded perspective view of a battery cell shown in FIG. 3. FIGS. 5A and 5B are exploded perspective views of a portion of the battery pack shown in FIG. 1, wherein FIGS. 5A and 5B illustrate different exploded perspective views from each other. FIGS. 6A and 6B are different perspective views of an insulating cap shown in FIG. 1.

Referring to FIGS. 1 to 2B, the battery pack according to an embodiment may include a plurality of battery cells C arranged (e.g., lined up) in a first direction Z1. In an implementation, the plurality of battery cells C may each have a main surface M, a first surface P1, and a second surface P2. In an implementation, main surfaces M of battery cells C adjacent to each other may face each other. In an implementation, the first surface P1 and the second surface P2 may respectively form both ends of each of the plurality of battery cells C in a second direction Z2 intersecting with the first direction Z1. In an implementation, an insulating cap H may be on the first surface P1 and the second surface P2 of the battery cell C, the insulating cap H extending from the first surface P1 and the second surface P2 onto a portion of the main surface M of the battery cell C to insulate the main surfaces M of the battery cells C adjacent to each other in the first direction Z1. In an implementation, a bus bar 30 may be on the insulating cap H and may electrically connect the plurality of battery cells to each other. In an implementation, a binding frame 40 may be configured to structurally bind the plurality of battery cells C to each other.

The battery pack according to an embodiment may include the plurality of battery cells C arranged in the first direction Z1, e.g., may include at least two of the plurality of battery cells C. The battery cell C may include an electrode assembly and a case 15 accommodating the electrode assembly. In an implementation, the electrode assembly may include first and second electrode plates having different polarities from each other, and a separator between the first and second electrode plates, and may include a wound-type electrode assembly in which a laminate having the separator between the first and second electrode plates is wound in a roll shape, or a stacked-type electrode assembly in which a plurality of layers are stacked with a separator between a plurality of first and second electrode plates. As will be described below, the electrode assembly may be electrically connected to first and second electrodes T1 and T2, which are on the case 15, and may output discharging power or receive charging power through the first and second electrodes T1 and T2.

The case 15 may accommodate an electrolyte together with the electrode assembly, and the first and second electrodes T1 and T2 (each electrically connected to the electrode assembly) may be on the case 15. The case 15 may include the first surface P1 and the second surface P2 on which the first and second electrodes T1 and T2 are respectively formed, the main surface M connecting between the first surface P1 and the second surface P2 and having a relatively larger area, and a side surface S connecting between the first surface P1 and the second surface P2 and having a relatively narrower area. The case 15 may form outer surfaces of the battery cell C, and the main surface M, the side surface S, the first surface P1, and the second surface P2 of the case 15 may correspond to the outer surfaces of the battery cell C. In an implementation, the main surface M, the side surface S, the first surface P1, and the second surface P2 of the case 15 may correspond to the main surface M, the side surface S, the first surface P1, and the second surface P2 of the battery cell C, respectively.

In an implementation, the first and second electrodes T1 and T2 may be at positions opposite to each other in the second direction Z2 (intersecting with the first direction Z1). The second direction Z2 may correspond to a direction intersecting with the first direction Z1, e.g., the second direction Z2 may correspond to a direction that vertically or laterally intersects with the first direction Z1. In an implementation, the second direction Z2 may correspond to a longitudinal (e.g., lengthwise) direction of the case 15, and may correspond to a longitudinal direction of the main surface M or a longitudinal direction of the side surface S, the main surface M, and the side surface S forming the case 15. The case 15 may have an elongated shape extending lengthwise in the second direction Z2, and the main surface M and the side surface S of the case 15 may also have an elongated shape extending lengthwise in the second direction Z2.

In an implementation, the first and second electrodes T1 and T2 may be respectively dispersed and on the first surface P1 and the second surface P2, which are opposite to each other in the second direction Z2. In an implementation, the first and second electrodes T1 and T2 may be adjacent and on one of the first surface P1 and the second surface P2, and the first and second electrodes T1 and T2 may not be on the other one of the first surface P1 and the second surface P2. In an implementation, electrical interference between the first and second electrodes T1 and T2 having different polarities from each other may be avoided, and an insulating structure for electrical insulation between the first and second electrodes T1 and T2 may be omitted by arranging the first and second electrodes T1 and T2 respectively on the first surface P1 and the second surface P2, which are opposite to each other in the second direction Z2, and the structure of the battery cell C may be simplified.

In an implementation, the first and second electrodes T1 and T2 may protrude from the first surface P1 and the second surface P2 of the battery cell C, respectively, and the first and second electrodes T1 and T2 may respectively protrude from the first surface P1 and the second surface P2 toward the outside that is opposite to the battery cell C in the second direction Z2. In an implementation, the first and second electrodes T1 and T2 may be integrally formed with the first surface P1 and the second surface P2, respectively. The first and second electrodes T1 and T2 may be respectively a portion of the first surface P2 and the second surface P2, and may respectively protrude from remaining portions of the first surface P1 and the second surface P2. In an implementation, the first and second electrodes T1 and T2 may not be in an insulated state from the first surface P1 and the second surface P2, respectively, and may be integrally formed with the first surface P1 and the second surface P2 as a portion of the first surface P1 and a portion of the second surface P2, respectively. In an implementation, the first and second electrodes T1 and T2 may be on the first surface P1 and the second surface P2, which are different from each other, respectively, a separate insulation structure between the first and second electrodes T1 and T2 may not be needed. In an implementation, assembly of the first and second electrodes T1 and T2 respectively with respect to the first surface P1 and the second surface P2 or a complicated structure for insulation between the first and second electrodes T1 and T2 may be omitted by integrally forming the first and second electrodes T1 and T2 of the battery cell C with the first surface P1 and the second surface P2, respectively, and structures of the first surface P1 and the second surface P2 respectively including the first and second electrodes T1 and T2 may be simplified. In an implementation, the first and second electrodes T1 and T2 respectively protruding from the first surface P1 and the second surface P2 may be exposed through an electrode hole TH of the insulating cap H on each of the first surface P1 and the second surface P2. In an implementation, each of the first and second electrodes T1 and T2 exposed through the electrode hole TH may be electrically connected to the bus bar 30 on the insulating cap H. In an implementation, an electrical connection between the bus bar 30 and each of the first and second electrodes T1 and T2 may be formed with the insulating cap H therebetween by forming the first and second electrodes T1 and T2 to respectively protrude from the first surface P1 and the second surface P2.

The first surface P1 and the second surface P2 may form both ends of the case 15 in the second direction Z2 corresponding to the longitudinal direction of the case 15, respectively. In an implementation, the first surface P1 and the second surface P2 may form both ends of the case 15 in the second direction Z2 corresponding to the longitudinal direction of the main surface M or the longitudinal direction of the side surface S, respectively, the main surface M and the side surface S forming the case 15. In an implementation, the insulating cap H may be on the first surface P1 and the second surface P2 of the case 15, e.g., the first surface P1 and the second surface P2 of the battery cell C. The bus bar 30 electrically connecting the plurality of battery cells C to each other, and the binding frame 40 structurally binding the plurality of battery cells C to each other may be on the insulating cap H.

The main surface M may correspond to a surface having the greatest area among surfaces forming the case 15. In an implementation, the case 15 may have a substantially rectangular parallelepiped shape, and the main surface M may correspond to a surface occupying the greatest area among surfaces of the case 15 having a substantially rectangular parallelepiped shape. In an implementation, the plurality of battery cells C may be arranged in the first direction Z1, e.g., the plurality of battery cells C may be arranged such that the main surfaces M of the plurality of battery cells C face each other, the main surface M being a surface occupying the greatest area among surfaces of each of the plurality of battery cells C, so that a stable support may be formed between battery cells C, which are arranged adjacent to each other, through the main surface M occupying the greatest area. In an implementation, even when the battery cells C, which are adjacent to each other, are supported with respect to each other through the main surface M, the main surfaces M of the battery cells C, which are arranged adjacent to each other, may not directly contact each other.

Referring to FIGS. 3 and 4, the case 15 of the battery cell C may have a polarity depending on a particular configuration of the battery cell C, and the main surfaces M of the battery cells C, which are adjacent to each other, may not directly contact each other such that cases 15 each having a polarity do not electrically interfere with each other. In an implementation, the insulating cap H on the first surface P1 and the second surface P2 may extend onto the main surface M, and the battery cells C, which are adjacent to each other, may be supported with respect to each other through a physical support of long-side portions Hb of the insulating caps H (of the battery cells C, e.g., a contact between the long-side portions Hb of the insulating caps H).

The insulating cap H may be on the first surface P1 and the second surface P2 of the case 15 and may extend onto the main surface M and the side surface S. In an implementation, the plurality of battery cells C arranged in the first direction Z1 may be arranged such that the main surfaces M thereof face each other, so that the battery cells C, which are adjacent to each other, may be supported with respect to each other through long-side portions Hb of the insulating caps H extending onto the main surfaces M. In an implementation, the insulating cap H may include a base portion Ha on the first surface P1 or the second surface P2, the long-side portion Hb extending from the base portion Ha onto the main surface M, and a short-side portion Hc extending from the base portion Ha onto the side surface S. In an implementation, the main surface M and the side surface S may include a pair of main surfaces M and a pair of side surfaces S, respectively, the pair of main surfaces M facing each other, and the pair of side surfaces S facing each other. The insulating cap H may include a pair of long-side portions Hb extending onto the pair of main surfaces M and a pair of short-side portions Hc extending onto the pair of side surfaces S, the pair of long-side portions Hb may face each other, and the pair of short-side portions Hc may face each other.

Referring to FIGS. 5A and 5B together with FIG. 3, an insulating gap g may be between the battery cells C, which are adjacent to each other, due to the long-side portions Hb of the insulating caps H of the battery cells C, e.g., between the main surfaces M of the battery cells C, which are adjacent to each other. In an implementation, in a position between the battery cells C which are adjacent to each other such that the main surfaces M thereof face each other, the main surfaces M may not directly contact each other while the long-side portions Hb of the insulating caps H of the battery cells C contact each other, the long-side portions Hb extending onto the main surfaces M, and the insulating gap g is between the main surfaces M of the battery cells C which are adjacent to each other, so that an electrical interference or contact between the main surfaces M of the battery cells C, which are adjacent to each other, may be avoided.

In an implementation, positions of the plurality of battery cells C arranged in the first direction Z1 may be aligned with each other through the insulating caps H thereof. In an implementation, a pair of assembling pins A1 and assembling holes A2 having shapes to be fitted to each other (e.g., complementary) may be at positions corresponding to each other in the first direction Z1 in the pair of long-side portions Hb of the insulating cap H. In an implementation, the long-side portions Hb may extend onto the main surfaces of the battery cells C adjacent to each other and coupled to each other as the assembling pins A1 and the assembling holes A2 are fitted to each other, and positions of the main surfaces M of the battery cells C adjacent to each other, e.g., positions the battery cells C adjacent to each other may be aligned with each other. In an implementation, a length of the assembling pin A1 and a depth of the assembling hole A2 may be appropriately adjusted such that the long-side portions Hb of the insulating caps H of the battery cells C, which are adjacent to each other, may be fitted to each other while being in contact with each other. In an implementation, as the assembling pin A1 and the assembling hole A2 are fitted to each other until the long-side portions Hb on which the assembling pin A1 and the assembling hole A2 are formed are in contact with each other, positions of the battery cells C, which are adjacent to each other, may be aligned with each other, and the battery cells C, which are adjacent to each other, may be supported with respect to each other through a contact between the long-side portions Hb. In an implementation, the length of the assembling pin A1 may be less than the depth of the assembling hole A2.

In an implementation, the assembling pin A1 and the assembling hole A2 may align the positions of the plurality of battery cells C arranged in the first direction Z1 with each other, and the assembling pin A1 and the assembling hole A2 may provide a certain degree of binding force to each other through the fitting thereof, e.g., through tight-fitting thereof. In an implementation, a strong binding force to the plurality of battery cells C may be provided through the binding frame 40 coupled with each of a plurality of insulating caps H in the first direction Z1 while extending in the first direction Z1 in which the plurality of battery cells C are arranged.

The side surface S of the case 15 may include the pair of side surfaces S facing each other in a third direction Z3 intersecting with the first direction Z1 in which the plurality of battery cells C are arranged. Unlike the first surface P1 and the second surface P2 on which the insulating cap H is arranged, or the main surfaces M facing each other of the battery cells C arranged adjacent to each other in the first direction Z1 in which the plurality of battery cells C are arranged, the side surfaces S of the cases 15 may be exposed to the outside from the plurality of battery cells C arranged in the first direction Z1. In an implementation, the side surfaces S of the battery cells C being exposed to the outside may mean that the side surfaces S of the battery cells C may be exposed to the outside from an array of battery cells C including the plurality of battery cells C, and in an embodiment having a separate pack housing for accommodating the array of battery cells C, the side surfaces S of the battery cells C may be covered by the pack housing.

In an implementation, referring to FIG. 4, the case 15 may be formed by including first and second boards 21 and 22 for respectively sealing first and second openings 11 and 12 of a hollow case 10 of which positions of the first surface P1 and the second surface P2 are opened. At this time, the first surface P1 and the second surface P2 of the case 15 may be respectively provided by the first and second boards 21 and 22, and the main surface M and the side surface S of the case 15 may be provided by the hollow case 10. In an implementation, the main surface M and the side surface S of the case 15 may correspond to surfaces of the hollow case 10, the surfaces being integrally formed through one extrusion operation, and the main surface M and the side surface S of the case 15 may be continuously connected to each other without a seam. The first and second boards 21 and 22 respectively forming the first surface P1 and the second surface P2 of the case 15 may be coupled to end surfaces of the hollow case 10, and may be coupled to end surfaces of the main surface M and the side surface S corresponding to the end surfaces of the hollow case 10 through welding or the like. In an implementation, a seam such as a weld line may be formed at boundaries between the first surface P1 and the main surface M, between the first surface P1 and the side surface S, between the second surface P2 and the main surface M, or between the second surface P2 and the side surface S along edges of the first surface P1 and the second surface P2 of the case 15.

The hollow case 10 having the first and second openings 11 and 12 therein and a unit size may be formed by cutting a member for forming the hollow case 10, that is continuously extruded by extrusion molding, to the unit size, and each case 15 may be formed through the first and second boards 21 and 22 respectively covering and sealing the first and second openings 11 and 12 of the hollow case 10 having the unit size. In an implementation, the hollow case 10 may have a shape extending (e.g., lengthwise) in the second direction Z2 through extrusion molding in the second direction Z2 as an extrusion direction. In an implementation, the case 15 may be continuously manufactured in a method in which a hollow member that is continuously extruded by extrusion molding is cut to a unit size, and the first and second openings 11 and 12 of the hollow case 10 formed through cutting may be respectively covered and sealed by the first and second boards 21 and 22. In an implementation, the operation time required to manufacture each case 15 may be reduced, and the manufacturing cost of the case 15 may be lowered.

In an implementation, the hollow case 10 having a unit size may be formed through cutting a hollow member that is continuously extruded by extrusion molding, and the capacity of each battery cell C may be easily increased or decreased through an increase or decrease of the unit size of the hollow case 10. In an implementation, in a method of increasing the capacity of each battery cell C, a length of an electrode assembly forming an inside of the battery cell C may be increased, and accordingly, a cutting size of a hollow member that is continuously extruded may be increased by an amount corresponding to the increased length of the electrode assembly, so that the hollow case 10 having an increased length in the second direction Z2 may be easily formed to accommodate the electrode assembly having the increased length.

In an implementation, the rigidity of the case 15 may be increased through extrusion molding of the hollow case 10 forming the main surface M and the side surface S of the battery cell C. Unlike another battery in which a case is formed from a plate-shaped case member through molding such as deep drawing or joining such as welding, it may not be necessary to limit the thickness of the case 15 for molding and welding, and thus, the rigidity of the case 15 may be ensured through a sufficient extrusion thickness thereof. In an implementation, the main surface M and the side surface S of the battery cell C may help ensure sufficient rigidity thereof through the hollow case 10 formed by extrusion molding, and as will be described below, the rigidity on sides of the first surface P1 and the second surface P2 may be ensured while arranging the binding frame 40 on the sides of the first surface P1 and the second surface P2 of the battery cell C. In an implementation, the first and second boards 21 and 22 respectively forming the first surface P1 and the second surface P2 of the battery cell C may have a relatively thinner thickness by considering welding with the hollow case 10, but the rigidity of the first surface P1 and the second surface P2 of the battery cell C may be ensured while arranging the binding frame 40 having sufficient rigidity on the sides of the first surface P1 and the second surface P2 of the battery cell C. In an implementation, a thickness of the hollow case 10 forming the main surface M and the side surface S of the battery cell C may be greater than thicknesses of the first and second boards 21 and 22 respectively forming the first surface P1 and the second surface P2 of the battery cell C. In an implementation, the rigidity at the sides of the first surface P1 and the second surface P2 may be supplemented by arranging the binding frame 40 on the first and second boards 21 and 22 having relatively thinner thicknesses, e.g., on the first surface P1 and the second surface P2.

Referring to FIGS. 3 and 4, the insulating cap H may be on the first surface P1 and the second surface P2 of the case 15, e.g., the first surface P1 and the second surface P2 of the battery cell C. The insulating cap H may extend from the first surface P1 and the second surface P2 onto the main surface M and the side surface S of the case 15. In an implementation, the insulating cap H may include the base portion Ha on the first surface P1 and the second surface P2, the long-side portion Hb extending from the base portion Ha onto the main surface M, and the short-side portion Hc extending from the base portion onto the side surface S. In an implementation, the long-side portion Hb of the insulating cap H may cover a portion of the main surface M of the battery cell C, e.g., a portion of the main surface M, the portion being adjacent to the first surface P1 and the second surface P2, and the short-side portion Hc of the insulating cap H may cover a portion of the side surface S of the battery cell C, e.g., a portion of the side surface S, the portion being adjacent to the first surface P1 and the second surface P2. In an implementation, the main surface M and the side surface S of the case 15 may be formed continuously with each other, and the pair of main surfaces M and the pair of side surfaces S may be formed continuously with each other. In an implementation, the long-side portion Hb and the short-side portion Hc of the insulating cap H may continuously surround the pair of main surfaces M and the pair of side surfaces S while extending in a continuous form with each other. In an implementation, the long-side portion Hb and the short-side portion Hc of the insulating cap H may continuously surround edges of the first and second boards 21 and 22 exposed toward or at a side of the main surface M and a side surface S or edges of the first surface P1 and the second surface P2 respectively forming the first and second boards 21 and 22.

The insulating cap H may cover the first surface P1 and the second surface P2 of the case 15 to provide insulation, and may provide insulation between the main surfaces M of the battery cells C which are adjacent to each other in the first direction Z1. According to a particular structure of the battery cell C, the case 15 may have a polarity, and the insulating cap H may provide insulation between the main surfaces M of the battery cells C which are arranged adjacent to each other in the first direction Z1 while providing insulation to the first surface P1 and the second surface P2 forming the case 15, so that a short circuit due to an external environment or electrical interference or connection between the battery cells C which are arranged adjacent to each other may be avoided. Accordingly, accidents such as malfunction or explosion and ignition of the battery cell C due to electrical interference may be reduced or prevented in advance.

In an implementation, an insulating coating may be on the main surface M and the side surface S of the battery cell C, e.g., an insulating coating may be on the outer surfaces of the hollow case 10 forming the main surface M and the side surface S of the battery cell C. In an implementation, an insulating coating may not be formed on the first and second boards 21 and 22 respectively forming the first surface P1 and the second surface P2 of the battery cell C. Instead of forming an insulating coating on the first surface P1 and the second surface P2, insulation with respect to the first surface P1 and the second surface P2 of the battery cell C may be ensured through the insulating cap H on the first surface P1 and the second surface P2. In another battery, an insulating coating may be entirely formed on the outer surfaces of the case, and a separate coating operation for forming an insulating coating on the first surface and the second surface may not be required. In an implementation, insulation with respect to the first surface P1 and the second surface P2 may be provided through the insulating cap H, instead of forming an insulating coating on the first surface P1 and the second surface P2 of the battery cell C. As will be described below, the insulating cap H may function as a bus bar holder supporting the bus bar 30, and the insulating cap H operating as a bus bar holder may also provide insulation with respect to the first surface P1 and the second surface P2 together, so that a coating operation on the first surface P1 and the second surface P2 of the battery cell C may be omitted.

Throughout the present specification, the insulating cap H providing insulation between the main surfaces M of the battery cells C adjacent to each other in the first direction Z1 may mean providing insulation between the first and second boards 21 and 22 forming a portion of the main surface M of the battery cell C. The main surface M of the battery cell C may be formed by the hollow case 10, e.g., may be formed by edges of the first and second boards 21 and 22 coupled to the hollow case 10 together with the hollow case 10. In an implementation, an insulating coating may be on the main surface M formed by the hollow case 10, and the insulating cap H may be on the main surface M formed by the edges of the first and second boards 21 and 22, and thus, the case 15 may be entirely insulated along the outer surfaces thereof. Throughout the present specification, the main surface M of the battery cell C being formed by the hollow case 10 may mean that most of the main surface M of the battery cell C may be formed by the hollow case 10 rather than meaning that the main surface M of the battery bell C is entirely formed by the hollow case 10, e.g., may mean that a portion of the main surface M may be formed by the edges of the first and second boards 21 and 22 respectively sealing the first and second openings 11 and 12 forming both ends of the hollow case 10. Similarly, throughout the present specification, the side surface S of the battery cell C being formed by the hollow case 10 may mean that most of the side surface S of the battery cell C may be formed by the hollow case 10 rather than meaning that the side surface S of the battery cell C is entirely formed by the hollow case 10, e.g., may mean that the a portion of the side surface S may be formed by the edges of the first and second boards 21 and 22 respectively sealing the first and second openings 11 and 12 forming both ends of the hollow case 10.

In an implementation, referring to FIGS. 5A and 5B, the insulating gap g may be between the main surfaces M of the battery cells C adjacent to each other in the first direction Z1 due to a contact between the long-side portions Hb of the insulating caps H of the battery cells C, the long-side portions Hb extending onto the main surfaces M, and the insulating gap g may be between the main surfaces M of the battery cells C which are adjacent to each other. In an implementation, an insulating sheet 80 may be in the insulating gap g between the main surfaces M of the battery cells C adjacent to each other, and insulation between the main surfaces M may be more reliably ensured through the insulating sheet 80. The insulating sheet 80 may provide electrical insulation and thermal insulation between the battery cells C adjacent to each other, so that electrical short circuit and thermal propagation between the battery cells C arranged adjacent to each other may be prevented.

In an implementation, the insulating cap H may include first and second insulating caps H1 and H2 respectively at a front position and a rear position of the battery cell C in the second direction Z2 to cover the first surface P1 and the second surface P2 of the battery cell C. In an implementation, the first surface P1 and the second surface P2 of the battery cell C may be alternately reversed in the first direction Z1 such that the battery cells C adjacent to each other are arranged in opposite orientations in the second direction Z2. The insulating cap H on the first surface P1 and the second surface P2 of the battery cell C may include the first and second insulating caps H1 and H2 at positions opposite to each other in the second direction Z2 regardless of the positions of the first surface P1 and the second surface P2 of the battery cell C. Throughout the specification, the first and second insulating caps H1 and H2 being at positions opposite to each other in the second direction Z2 regardless of the positions of the first surface P1 and the second surface P2 of the battery cell C may mean that the first insulating cap H1 may be on the first surface P1 of the battery cell C or on the second surface P2 of the battery cell C depending on a particular orientation of the battery cell C, and similarly, may mean that the second insulating cap H2 may be on the first surface P1 of the battery cell C or on the second surface P2 of the battery cell C. Throughout the present specification, the first and second insulating caps H1 and H2 may be used to distinguish and refer to an insulating cap H at a front position of the battery cell C and an insulating cap H at a rear position of the battery cell C in the second direction Z2, respectively. As will be described below, similarly to the first and second insulating caps H1 and H2, the bus bar 30 may also include first and second bus bars 31 and 32 at opposite positions to each other in the second direction Z2, and the first and second bus bars 31 and 32 may be respectively on the first surface P1 and the second surface P2 of the battery cell C or on the second surface P2 and the first surface P1 of the battery cell C depending on an orientation of the battery cell C. Throughout the present specification, the first and second bus bars 31 and 32 may be used to distinguish and refer to a bus bar 30 at a front position of the battery cell C and a bus bar 30 at a rear position of the battery cell C in the second direction Z2, respectively.

Referring to FIGS. 5A and 5B together with FIG. 3, the insulating cap H may provide insulation with respect to the case 15 and regulate an assembly position of the bus bar 30 electrically connecting different battery cells C to each other at the same time. In an implementation, the insulating cap H may function as a bus bar holder supporting the bus bar 30 and guiding the assembly position of the bus bar 30. In an implementation, the insulating cap H operating as a bus bar holder may be formed in a unit of each battery cell C, and the expandability of a battery pack may be provided in the first direction Z1 in which the battery cells C are arranged. In an implementation, as the number of battery cells C arranged in the first direction Z1 is increased, output and performance of a battery pack may be flexibly responded, a bus bar holder that adaptively expands and contracts according to the number of battery cells C may be provided through the insulating cap H formed in units of battery cells C to be assembled in each of battery cells C, and there may be no need to provide bus bar holders having different sizes according to the number of battery cells corresponding to the required output and capacity.

In an implementation, the bus bar 30 may provide an electrical connection between the battery cells C adjacent to each other, and a parallel connection between the battery cells C having the same polarity may be formed, or a series connection between the battery cells C having opposite polarities may be formed. In an implementation, the bus bar 30 may electrically connect the battery cells C adjacent to each other between the battery cells C adjacent to each other in the first direction Z1. In an implementation, the bus bar 30 may form a series connection between the battery cells C which are adjacent to each other and have opposite polarities. In an implementation, the battery cells C adjacent to each other may be alternately arranged in orientations opposite to each other in the first direction Z1 such that the first surface P1 and the second surface P2 on which the first and second electrodes T1 and T2 are respectively formed are positioned at opposite positions in the second direction Z2, and a plurality of bus bars 30 may connect the plurality of battery cells C arranged in the first direction Z1 in series while being alternately arranged at alternating positions in the first direction Z1. In an implementation, the bus bar 30 may include first and second bus bars 31 and 32 respectively at a front position and a rear position of the battery cell C in the second direction Z2 to be respectively on the first surface P1 and the second surface P2 of the battery cell C. The first and second bus bars 31 and 32 may be at positions opposite to each other of the battery cell C in the second direction Z2, and may be respectively at a front position and a rear position of the battery cell C in the second direction Z2.

The bus bar 30 may include coupling pieces 34 at both ends thereof coupled to electrodes of the battery cells C adjacent to each other, and a connecting piece 35 between the coupling pieces 34 at the both ends of the bus bar 30. In an implementation, each of the coupling pieces 34 may be flat on an electrode T of the battery cell C to couple with the electrode T, and the connecting piece 35 may be concavely formed to absorb a positional flow between the coupling pieces 34 at both ends of the bus bar 30. In an implementation, the bus bar 30 may help absorb or compensate for a positional flow between the battery cells C adjacent to each other or a positional flow between positions of the electrodes T of the battery cells C adjacent to each other through the connecting piece 35 that is concavely formed to provide elasticity between the coupling pieces 34 formed at both ends of the bus bar 30.

In an implementation, the connecting piece 35 of the bus bar 30 may protrude from the coupling pieces 34 respectively connected to the first and second electrodes T1 and T2 of the battery cells C adjacent to each other toward the first surface P1 and the second surface P2 of the battery cells C adjacent to each other, and an insulation of the connecting piece 35 from the battery cell C may be ensured through the insulating cap H on the first surface P1 and the second surface P2 of the battery cells C adjacent to each other. In an implementation, the coupling pieces 34 of the bus bar 30 may be respectively connected to the first and second electrodes T1 and T2 of the battery cells C adjacent to each other, and a free space that may protrude from the coupling pieces 34 toward the first surface P1 and the second surface P2 may be ensured through the coupling pieces 34 respectively coupled to the first and second electrodes T1 and T2 protruding from the first surface P1 and the second surface P2 of the battery cells C. The bus bar 30 may further include an access piece 38 protruding from the connecting piece 35, and the access piece 38 of the bus bar 30 may be connected to a circuit unit 50.

The bus bar 30 may be guided to an assembly position through a bus bar guide P on the insulating cap H. In an implementation, the assembly position may correspond to a fixed position of the bus bar 30 guided by the insulating cap H for position alignment between the bus bar 30 and the electrode T of the battery cell C. In an implementation, the electrode hole TH exposing the electrode T of the battery cell C may be at the assembly position of the insulating cap H, and the bus bar guide P may be around the electrode hole TH. The electrode T of the battery cell C, e.g., exposed through the electrode hole TH, may be coupled to the bus bar 30 on the insulating cap H, e.g., an electrical connection between the electrode T of the battery cell C and the bus bar 30 may be formed through laser welding or the like. The bus bar guide P may extend in parallel with the coupling piece 34 of the bus bar 30 to guide the coupling piece 34 of the bus bar 30, and may protrude from the periphery of the electrode hole TH in the second direction Z2. In an implementation, the bus bar guide P may extend in the first direction Z1 across the periphery of the electrode hole TH, and may include a pair of bus par guides P extending in parallel with each other with the electrode hole TH therebetween. The coupling piece 34 of the bus bar 30 may face the electrode T of the battery cell C and may be connected to the electrode T of the battery cell C, wherein the electrode T is exposed through the electrode hole TH formed between the pair of bus par guides P. In an implementation, the coupling piece 34 of the bus bar 30 may be coupled with the electrode T of the battery cell C through the bus bar guide P while facing the electrode T at a fixed position, the electrode T being exposed through the electrode hole TH.

The fixing piece F may be on the insulating cap H. As will be described below, the fixing piece F may provide a coupling position coupled with the binding frame 40 on the first surface P1 and the second surface P2 of the battery cell C. The binding frame 40 may couple with the fixing piece F formed at a position of each of the battery cell C while continuously extending in the first direction Z1, and may physically bind the plurality of battery cells C arranged in the first direction Z1. In an implementation, the plurality of battery cells C arranged in the first direction Z1 may be physically bound to each other through the binding frame 40 and electrically connected to each other through the bus bar 30 to form one battery pack.

In an implementation, the fixing pieces F in respective insulating caps H may be arranged in or aligned along a row in the first direction Z1 to couple with the binding frame 40 extending in the first direction Z1. In an implementation, the fixing pieces F in respective insulating caps H may be arranged in a row in the first direction Z1 while being at the same height in the third direction Z3.

In an implementation, the fixing pieces F may be in two rows as a whole by including first and second fixing pieces F1 and F2, each forming or being aligned along a row in the first direction Z1. In an implementation, the first and second fixing pieces F1 and F2 may be at positions on both sides of the electrode hole TH in the third direction Z3 with the electrode hole TH therebetween, and may be arranged in two rows at the positions on both sides of the electrode hole TH, respectively. In an implementation, the first and second fixing pieces F1 and F2, which are respectively in two rows, may be spaced apart from each other in the third direction Z3, e.g., may be at positions spaced apart from each other with the electrode hole TH therebetween. In an implementation, first and second binding frames 41 and 42, which are different from each other, may be coupled to the first and second fixing pieces F1 and F2, respectively, and the battery cells C may be more firmly bound to each other to form an array through the first and second fixing pieces F1 and F2 to which the first and second binding frames 41 and 42, which are different from each other, are fixed, respectively. In an implementation, the fixing piece F may include the first and second fixing pieces F1 and F2 in different rows from each other, and the binding frame 40 may include the first and second binding frames 41 and 42 respectively coupled to the first and second fixing pieces F1 and F2. In an implementation, the fixing piece F and the binding frame 40 may be coupled to each other through a thermal operation such as welding, e.g., the fixing piece F and the binding frame 40 may both include a metal material. In an implementation, the fixing piece F and the binding frame 40 may be coupled to each other through mechanical fastening. In an implementation, a fastening hole having a screw thread may be in the fixing piece F, and the binding frame 40 may also be coupled to the fixing piece F through a fastening member thereof fitted into the fastening hole of the fixing piece F through a through hole formed in the binding frame 40. In an implementation, the binding frame 40 may be fixed through a thermal operation such as welding, so that a binding structure of the plurality of battery cells C arranged in the first direction Z1 may be simplified, and an entire length of a battery pack may be shortened in the second direction Z2.

The binding frame 40 may extend (e.g., lengthwise) in the first direction Z1, and may include an elongated plate material extending lengthwise in the first direction Z1. In an implementation, the binding frame 40 may include the first and second binding frames 41 and 42 extending in parallel with each other in the first direction Z1 and respectively coupled to the first and second fixing pieces F1 and F2, which are in different rows (spaced apart in the third direction Z3). In an implementation, the first and second binding frames 41 and 42 may extend in parallel with each other in the first direction Z1, and may have different shapes. In an implementation, the first binding frame 41 may be at a relatively lower position in the third direction Z3, and may include first and second portions 41*a* and 41*b* each extending in the first direction Z1 and bent with respect to each other. The second binding frame 42 may be at a relatively upper position in the third direction Z3, and may have a flat-plate shape, unlike the first binding frame 41.

The first binding frame 41 is described in more detail as follows. In an implementation, the first binding frame 41 may include the first portion 41*a* facing the insulating cap H having the fixing piece F, and the second portion 41*b* bent from the first portion 41*a* and protruding (e.g., outwardly) in the second direction Z2. The first binding frame 41 may be coupled with the fixing piece F through the first portion 41*a* while overlapping the fixing piece F of the insulating cap H, and may include the second portion 41*b* exposed to the outside of the circuit unit 50 on the first binding frame 41 while protruding from the first portion 41*a* coupled to the fixing piece F in the second direction Z2.

In an implementation, the binding frame 40 may be on the insulating cap H, and the circuit unit 50 may be on the binding frame 40. In an implementation, the first binding frame 41 at a relatively lower position in the third direction Z3 may be at a height that partially overlaps the circuit unit 50, and the second binding frame 42 at a relatively higher position may be at a height outside (e.g., above) the circuit unit 50. In an implementation, the second portion 41*b* bent from the first portion 41*a* of the first binding frame 41 (overlapping the circuit unit 50) may protrude toward the outside of the circuit unit 50. In an implementation, the second portion 41*b* of the first binding frame 41 may extend from the first portion 41*a* between the circuit unit 50 and the insulating cap H toward the outside of the circuit unit 50 opposite to the battery cell C in the second direction Z2. In an implementation, the circuit unit 50 may be approximately at a height between the first and second binding frames 41 and 42 in the third direction Z3, and the circuit unit 50 may be at a height that partially overlaps the first binding frame 41.

The first portion 41*a* of the first binding frame 41 may provide a binding position for physically binding the plurality of battery cells C arranged in the first direction Z1, and the second portion 41*b* of the first binding frame 41 may provide rigidity of the first binding frame 41 while being bent outwardly from the first portion 41*a* in the second direction Z2. In an implementation, the second portion 41*b* may provide sufficient rigidity that may help suppress bending or torsion of the first binding frame 41 in the first direction Z1, and may help provide structural rigidity of the entire battery pack.

The binding frame 40 may bind the plurality of battery cells C while extending across the plurality of battery cells C arranged in the first direction Z1, and may provide rigidity of the battery pack to help prevent deformation such as bending or drooping in the first direction Z1 in which the plurality of battery cells C are arranged. In an implementation, the binding frame 40 may include a metal material having excellent heat transfer performance and may be on an edge of the battery pack, the edge being relatively closer to the outside, so that the binding frame 40 may also function as a heat dissipation plate for the battery pack. In an implementation, the binding frame 40 may provide heat dissipation with respect to the battery cell C through the fixing piece F to which the binding frame 40 is coupled.

In an implementation, the second portion 41*b* of the first binding frame 41 may function as a heat dissipation plate while being exposed to the outside from the first portion 41*a* between the insulating cap H and the circuit unit 50. In an implementation, the second portion 41*b* of the first binding frame 41 may provide heat dissipation with respect to the battery cell C through the fixing piece F while being integrally bent outwardly from the first portion 41*a* coupled to the fixing piece F of the insulating cap H, or may provide heat dissipation with respect to the circuit unit 50 while being integrally bent outward from the first portion 41*a* between the fixing piece F and the circuit unit 50.

The binding frame 40 may be in pairs at a front position and a rear position of the battery cell C, respectively, e.g., may include the first and second binding frames 41 and 42 respectively being coupled with the first and second fixing pieces F1 and F2 arranged in two rows at the front position of the battery cell C, and the first and second binding frames 41 and 42 respectively coupled with the first and second fixing pieces F1 and F2 arranged in two rows at the rear position of the battery cell C.

In an implementation, the binding frame 40 may provide rigidity to sides of the first surface P1 and the second surface P2 of the battery cell C, and the rigidity of the main surface M and the side surface S of the battery cell C may be provided through the hollow case 10 provided by extrusion molding while forming the main surface M and the side surface S of the battery cell C. In an implementation, sufficient rigidity with respect to the outer surfaces of the entire battery cell C including the main surface M, the side surface S, and the first and second surfaces P1 and P2 of the battery cell C may be ensured through the hollow case 10 and the binding frame 40 on each of sides of the first and second surfaces P1 and P2 of the battery cell C.

In an implementation, the fixing piece F may be integrally formed with the insulating cap H, and may be integrally formed with a body of the insulating cap H through insert injection molding. In an implementation, the fixing piece F may include a metal material, and the insulating cap H may include an insulating material, e.g., a polymer resin material. The fixing piece F and the insulating cap H, which have different materials as described above, may be integrally formed or coupled with each other through insert injection molding.

In an implementation, the first and second fixing pieces F1 and F2 may be at positions on both ends (or both edge positions) of the insulating cap H in the third direction Z3, and the electrode hole TH may be at a central position of the insulating cap H, the central position corresponding to a position between the first and second fixing pieces F1 and F2. As will be described below, a bonding area B may be formed together with the electrode hole TH at the central position of the insulating cap H, the central position corresponding to a position between the first and second fixing pieces F1 and F2. At the central position of the first and second fixing pieces F1 and F2, the electrode hole TH may be at a position that is relatively closer or proximate to the first fixing piece F1, and the bonding area B may be at a position that is relatively closer or proximate to the second fixing piece F2. In an implementation, the central position between the first and second fixing pieces F1 and F2 may be divided into two, so that the electrode hole TH may be at a position that is close to the first fixing piece F1, and the bonding area B may be at a position that is close to the second fixing piece F2. In an implementation, the electrode hole TH may correspond to an opening portion of the insulating cap H, and the bonding area B may correspond to a solid portion of the insulating cap H, and the electrode hole TH and the bonding area B may in areas that do not overlap each other, so that respective functions thereof may not be disturbed. In an implementation, the electrode T of the battery cell C is exposed through the open electrode hole TH, and an adhesion point between the insulating cap H and the battery cell C may be provided through the bonding area B corresponding to the unopened solid portion.

In an implementation, at the central position between the first and second fixing pieces F1 and F2, the electrode hole TH may be at a position that is relatively biased toward or proximate to the first fixing piece F1, and the bonding area B may be at a position that is relatively biased toward or proximate to the second fixing piece F2. In an implementation, the fixing piece F may include the first and second fixing pieces F1 and F2 respectively at positions at both sides thereof, with the electrode hole TH therebetween. In an implementation, the first fixing piece F1 may be at a position that is relatively closer to the electrode hole TH, and the second fixing piece F2 may be at a position that is relatively far from the electrode hole TH.

In an implementation, the insulating cap H may be assembled on the battery cell C, e.g., at the base portion Ha on the first and second surfaces P1 and P2, and the long-side portion Hb and the short-side portion Hc respectively extending from the base portion Ha to the main surface M and the side surface S of the battery cell C. In an implementation, the long-side portion Hb and the short-side portion Hc, which extend (e.g., inwardly) from the base portion Ha formed on the first and second surfaces P1 and P2 while being bent toward the battery cell C in the second direction Z2 may be on the battery cell C and surrounding an edge between the first and second surfaces P1 and P2 and the main surface M and an edge between the first and second surfaces P1 and P2 and the side surface S, respectively. In an implementation, the base portion Ha, and the long-side portion Hb and the short-side portion Hc, which are bent or extend from the base portion Ha, may provide a space that may accommodate end portions on sides of the first and second surfaces P1 and P2 of the battery cell C.

The insulating cap H may be fixed on the battery cell C, e.g., assembled on the battery cell C in a tight-fitting method (e.g., an interference fit). In an implementation, the insulating cap H may be attached on the battery cell C and may be assembled on the battery cell C. In an implementation, an adhesive may be between the insulating cap H and the battery cell C to facilitate adhesion therebetween. In an implementation, the bonding area B may be in the insulating cap H, and the insulating cap H and the first and second surfaces P1 and P2 of the battery cell C may be adhered to each other through or at the bonding area B. The bonding area B may be at a central position of the insulating cap H, e.g., a position that does not overlap the electrode hole TH at the central position between the first and second fixing pieces F1 and F2. In an implementation, the bonding area B may be around or proximate to the second fixing piece F2 rather than around the first fixing piece F1 where the electrode hole TH is formed. The insulating cap H including the bonding area B may be attached on the battery cell C through an adhesive between the bonding area B and the first and second surfaces P1 and P2 of the battery cell C. In an implementation, an adhesive may be between the insulating cap H and the first and second surfaces P1 and P2 of the battery cell C. The adhesive may be between the first and second surfaces P1 and P2 and the bonding area B corresponding to an unopened solid portion instead of the electrode hole TH (which is opened to expose the electrode T of the battery cell C) to facilitate adhesion therebetween.

The bonding area B may be at a central position between the first and second fixing piece F1 and F2 in the insulating cap H to form a stable adhesion with the battery cell C, and may be at a position that is close to any one of the first and second fixing pieces F1 and F2, e.g., the second fixing piece F2, to avoid interference with the electrode hole TH at the central position.

In an implementation, the insulating cap H on the first and second surfaces P1 and P2 of the battery cell C may be adhered on the first and second surfaces P1 and P2 of the battery cell C, and an entire length of a battery pack may be shortened in the second direction Z2. Unlike other batteries, in which the insulating cap H is fixed by using a method other than adhesion, e.g., a mechanical fastening method or the like, a fixing structure of the insulating cap H according to an embodiment may be simplified, and there is no need to allocate a space for fixing the insulating cap H, the entire length of the battery pack may be shortened in the second direction Z2.

In an implementation, an entire length of a battery pack in the second direction Z2 and a length of each battery cell C in the second direction Z2 may be at an equal level to each other, and the energy density of the battery pack may be increased by saving space. In an implementation, the size of a battery pack may be reduced compared to a battery having the same output and capacity, and a battery pack having a higher output and capacity compared to a battery having the same size may be provided.

In an implementation, the insulating cap H may be fixed in such a method that the insulating cap H formed individually for respective battery cells C is adhered to each battery cell C, the insulating cap H may be fixed to each individual battery cell C before binding the plurality of battery cells C arranged in the first direction Z1, and accordingly, an operation time may be reduced in binding the plurality of battery cells C arranged in the first direction Z1. In an implementation, time required for curing an adhesive may be reduced, and time wasted when binding the plurality of battery cells C to form a battery pack may be saved.

The bus bar 30 and the binding frame 40 may be on the insulating cap H. In an implementation, the electrode hole TH and the fixing piece may be on the insulating cap H at exclusive positions that do not overlap with each other, and the bus bar 30 and the binding frame 40 respectively coupled to the electrode hole TH and the fixing piece F, which are at exclusive positions with respect to each other, may also be on the insulating cap H at exclusive positions that do not overlap each other. In an implementation, the electrode hole TH of the insulating cap H may be between the first and second fixing pieces F1 and F2 and may be at an exclusive position that does not overlap the first and second fixing pieces F1 and F2. In an implementation, the first and second binding frames 41 and 42 respectively coupled to the first and second fixing pieces F1 and F2, and the bus bar 30 coupled to the electrode T of the battery cell C may be on the insulating cap H at exclusive positions that do not overlap each other, wherein the electrode T is exposed through the electrode hole TH.

Referring to FIGS. 2A and 2B, the circuit unit 50 may be on the bus bar 30 on the insulating cap H. The circuit unit 50 may supply charging and discharging power of the plurality of battery cells C (arranged in the first direction Z1 and electrically connected to each other through the bus bar 30 to the outside), or may mediate or control a flow of charging and discharging power of the plurality of battery cells C and an external device to be supplied from the outside. In an implementation, the external device may correspond to an external load receiving discharging power from the plurality of battery cells C or an external charger for supplying charging power to the plurality of battery cells C.

The circuit unit 50 may be electrically connected to the plurality of bus bars 30 and obtain, through each of the plurality of bus bars 30, state information about each battery cell C, e.g., state information such as voltage information and temperature information about each battery cell C. In an implementation, the circuit unit 50 may form an electrical connection with each of the plurality of bus bars 30 while extending across the plurality of bus bars 30 in the first direction Z1, and may obtain voltage information on the battery cell C connected to each of the plurality of bus bars 30. The bus bar 30 may be electrically connected to each battery cell C and thermally connected to each battery cell C. In an implementation, the bus bar 30 may obtain state information of the battery cell C while being electrically connected to the electrode T of each battery cell C, and may obtain temperature information of the battery cell C while being thermally connected to an inside of the battery cell C, the inside being connected to the electrode T of each of the battery cell C, e.g., an electrode assembly inside of the battery cell C.

In an implementation, the circuit unit 50 may be connected to each bus bar 30, obtain state information of the battery cell C through each bus bar 30, and form charging and discharging paths of a group of battery cells C electrically connected to each other. In an implementation, the circuit unit 50 may include a connector terminal 55 to which state information of the battery cell C is output, and an external terminal E to which charging and discharging currents of the battery cell C are input and output. In an implementation, the circuit unit 50 may include a circuit board and a plurality of devices on the circuit board, and may include the connector terminal 55 and the external terminal E, which are on the circuit board. In an implementation, the connector terminal 55 may be at a central position of the circuit unit 50 in the first direction Z1, and the external terminal E may include a pair of first and second external terminals E1 and E2 respectively at positions on both sides of the circuit unit 50 in the first direction Z1.

The circuit unit 50 may include first and second circuit units 51 and 52 respectively at a front position and a rear position of the battery cell C in the second direction Z2. In an implementation, the first circuit unit 51 may be connected to the first bus bar 31 at the front position of the battery cell C, and the second circuit unit 52 may be connected to the second bus bar 32 at the rear position of the battery cell C.

In an implementation, the first and second circuit units 51 and 52 may be connected to each other, and the first and second circuit units 51 and 52 may cooperate with each other to control charging and discharging operations of the battery cell C. In an implementation, each of the first and second circuit units 51 and 52 may include the pair of first and second external terminals E1 and E2 respectively at positions on both sides of each of the first and second circuit units 51 and 52 in the first direction Z1, and the connector terminal 55 at a central position of each of the first and second circuit units 51 and 52 in the first direction Z1. In an implementation, an external device may be connected to the external terminals E1 and E2 and the connector terminal 55 of the circuit unit 50, e.g., of one of the first and second circuit units 51 and 52. In an implementation, charging and discharging power of the battery cell C may be input and output through the external terminals E1 and E2 and state information of the battery cell C may be output through the connector terminal 55 of the circuit unit 50, the external terminals E1 and E2 and the connector terminal 55 of the circuit unit 50 being connected to the external device. In an implementation, the first and second circuit units 51 and 52 may cooperate with each other to obtain state information of the battery cell C, and the circuit unit 50 connected to an external device may form charging and discharging paths of the battery cell C, and control charging and discharging operations of the battery cell C, such as opening and closing the charging and discharging paths of the battery cell C. In an implementation, the external terminals E1 and E2 and the connector terminal 55 may be in both of the first circuit unit 51 in the front position of the battery cell C and the second circuit unit 52 in the rear position of the battery cell C in the second direction Z2, convenience of connection that may be connected to an external device in both directions may be provided.

In an implementation, the first circuit unit 51 may form an electrical connection with all of the first bus bars 31 at the front position of the battery cell C in the second direction Z2, or may form a direct electrical connection with only some selected first bus bars 31, instead of forming an electrical connection with all of the first bus bars 31. In an implementation, the second circuit unit 52 may form an electrical connection with all of the second bus bars 32 at the rear position of the battery cell C in the second direction Z2, or may form a direct electrical connection with only some selected second bus bars 32 instead of forming an electrical connection with all of the second bus bars 32.

The circuit unit 50 may obtain state information of the battery cell C and control the charging and discharging operations of the battery cell C, e.g., may take protective measures such as stopping charging and discharging in response to abnormal situations such as malfunction or ignition or explosion of the battery cell C. In an implementation, the circuit unit 50 may function as a battery management system (BMS). In an implementation, to an extent that the circuit unit 50 may obtain sufficient state information for the control of the battery cell C, by considering cost instead of forming a connection with all of the first and second bus bars 31 and 32, the circuit unit 50 may form a connection with a portion of selected first and second bus bars 31 and 32.

In an implementation, the circuit unit 50 may extend (e.g., lengthwise) in the first direction Z1 (e.g., in which the plurality of bus bars 30 are arranged), and may cross the insulating caps H on which the plurality of bus bars 30 are arranged. In an implementation, the circuit unit 50 may extend along the binding frame 40 together with the plurality of bus bars 30. In an implementation, the insulating cap H may be on the first and second surfaces P1 and P2 of the battery cell C, the bus bar 30 and the binding frame 40 may be on the insulating cap H, and the circuit unit 50 may be on the bus bar 30 and the binding frame 40.

In an implementation, the first binding frame 41 may be at a height that partially overlaps the circuit unit 50 in the third direction Z3, the second binding frame 42 may be at a height outside the circuit unit 50, and the second portion 41*b* bent from the first portion 41*a* of the first binding frame 41 overlapping the circuit unit 50 may extend toward the outside of the circuit unit 50. In an implementation, the second portion 41*b* of the first binding frame 41 may extend from the first portion 41*a* between the circuit unit 50 and the insulating cap H toward the outside of the circuit unit 50 opposite to the battery cell C in the second direction Z2. In an implementation, the circuit unit 50 may be arranged approximately at a height between the first and second binding frames 41 and 42 in the third direction Z3, and the circuit unit 50 may be arranged at a height that partially overlaps the first binding frame 41.

In an implementation, the insulating cap H, the bus bar 30, the binding frame 40, the circuit unit 50, or the like may respectively include the first and second insulating caps H1 and H2, the first and second bus bars 31 and 32, the first and second binding frames 41 and 42, and the first and second circuit units 51 and 52, which are respectively at a front position and a rear position of the battery cell C in the second direction Z2, and the insulating cap H, the bus bar 30, the binding frame 40, the circuit unit 50 or the like may be respectively at the front position and the rear position, which are opposite to each other, of the battery cell C in the second direction Z2.

In an implementation, the circuit unit 50 may be at, e.g., only one of a front position or a rear position of the battery cell C in the second direction Z2, and may not be at both the front position and the rear position of the battery cell C. In an implementation, a battery back may include a single circuit unit 50, and the circuit unit 50 may be at the front position of the battery cell in the second direction Z2. In an implementation, the circuit unit 50 may form a connection with the first bus bar 31 at the front position of the battery cell C in the second direction Z2, and may not form a connection with the second bus bar 32 at the rear position of the battery cell C in the second direction Z2. In an implementation, the circuit unit 50 and the second bus bar 32, which are respectively at the front position and the rear position in the second direction Z2, may be electrically connected to each other through a lead line connecting the circuit unit 50 at the front position in the second direction Z2 and the second bus bar 32 at the rear position in the second direction Z2 to each other.

In an implementation, the capacity of the battery cell C may be easily increased through extrusion molding of the hollow case 10 forming the main surface M and the side surface S of the battery cell C, and the rigidity of the battery cell C or a battery pack including the plurality of battery cells C may be ensured by or through the hollow case 10, which may be extrusion molded, and the binding frame 40 on the first and second surfaces P1 and P2 of the battery cell C. In an implementation, insulation between the battery cells C, which may be adjacent to each other, may be ensured by the insulating cap H on the first and second surfaces P1 and P2 of the battery cell C. In addition, the bus bar 30 electrically connecting the battery cells C, which are adjacent to each other, may be supported through the insulating cap H. As such, through the insulating cap H that serves both as an insulating function and a function of a bus bar holder, a structure of an entire battery pack may be simplified. In addition, the insulating cap H performing the function of a bus bar holder may be individually formed for each battery cell C, and a bus bar holder in a form that is adaptively stretched and contracted according to the number of battery cells C arranged in the first direction Z1 may be provided. In an implementation, as the number of battery cells C arranged in the first direction Z1 is increased or decreased, expandability of a battery pack according to the desired output and capacity may be provided.

In an implementation, the insulating cap H on the first and second surfaces P1 and P2 of the battery cell C may be fixed, e.g., in an adhesive manner, a fixing structure of the insulating cap H may be simplified, and an entire length of the battery pack may be shortened in the second direction Z2. In an implementation, operation time wasted in an operation of binding the plurality of battery cells C arranged in the first direction Z1 due to curing time for adhesion of the insulating cap H may be avoided through the insulating cap H formed individually for each battery cell C, and the operation time of the battery pack may be utilized efficiently.

According to the present disclosure, a battery pack may include a plurality of battery cells, wherein insulation between battery cells, which may be adjacent to each other may be ensured, the rigidity of each of the plurality of battery cells may be improved while the capacity thereof is easily increased, and a manufacturing operation of the battery pack may be simplified.

According to the present disclosure, a battery pack that is stretchable or expandable in an arrangement direction of battery cells to meet desired output and capacity may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged in a first direction, each battery cell of the plurality of battery cells having a pair of main surfaces, a first surface, and a second surface, respective main surfaces of battery cells that are adjacent to each other facing each other, and the first surface and the second surface respectively forming opposite ends of each of the plurality of battery cells in a second direction intersecting with the first direction;
an insulating cap on each of the first surface and the second surface of each battery cell, the insulating cap extending from each of the first surface and the second surface onto an outermost portion of each of the pair of main surfaces of each battery cell and insulating the main surfaces of battery cells adjacent to each other in the first direction, and the insulating cap extending from the first surface of each battery cell being separated and spaced apart in the second direction from the insulating cap extending from the second surface of each battery cell;

a bus bar on the insulating cap and electrically connecting the plurality of battery cells to each other; and a binding frame configured to structurally bind the plurality of battery cells to each other, wherein each of the plurality of battery cells includes an electrode assembly inside a case, the case being a hollow case and including:

the pair of the main surfaces facing each other and occupying a relatively large area, the pair of main surfaces connecting the first surface and the second surface to each other, a pair of side surfaces facing each other and occupying a smaller area than the pair of main surfaces, the pair of side surfaces connecting the first surface and the second surface to each other, and first and second boards closing open ends at opposite ends of the hollow case, the first and second boards defining the first and second surfaces, respectively, and wherein the outermost portion of each of the pair of main surfaces of each battery cell is a surface facing an exterior of the case.

2. The battery pack as claimed in claim 1, wherein the insulating cap is individually provided on each of the first surface and the second surface of each battery cell of the plurality of battery cells arranged in the first direction, such that each battery cell of the plurality of battery cells includes two separate and discrete insulating caps.

3. The battery pack as claimed in claim 1, wherein each of the pair of main surfaces and each of the side surfaces of each battery cell have an elongated shape extending lengthwise in the second direction.

4. The battery pack as claimed in claim 1, wherein the insulating cap includes:

a base portion on the first surface or the second surface of a corresponding battery cell;

a long-side portion extending from the base portion onto the pair of main surfaces of the corresponding battery cell; and a short-side portion extending from the base portion onto the side surfaces of the corresponding battery cell.

5. The battery pack as claimed in claim 4, wherein the long-side portion and the short-side portion continuously surround edges of the first surface or the second surface of the corresponding battery cell.

6. The battery pack as claimed in claim 1, wherein:

the pair of main surfaces and the side surfaces are arranged to face each other, respectively, and the pair of main surfaces and the side surfaces of each battery cell are outer surfaces of the hollow case of each battery cell and are continuously connected to each other.

7. The battery pack as claimed in claim 6, wherein each of the hollow cases includes a first opening and a second opening respectively at both ends of the hollow case, each hollow case being formed by cutting of a hollow member continuously extruded in the second direction.

8. The battery pack as claimed in claim 1, wherein a thickness of the hollow case is greater than a thickness of the first board and greater than a thickness of the second board.

9. The battery pack as claimed in claim 1, wherein the first surface and the second surface of each battery cell are outer surfaces of the first board and the second board, respectively.

10. The battery pack as claimed in claim 1, wherein:

each battery cell includes an electrode connected to the bus bar, and the electrode of each battery cell includes a first electrode and a second electrode respectively protruding from the first surface and the second surface of each battery cell.

11. The battery pack as claimed in claim 10, wherein each insulating cap includes:

an electrode hole exposing the electrode of a corresponding battery cell; and a bus bar guide configured to guide a position of the bus bar around the electrode hole.

12. The battery pack as claimed in claim 11, wherein:

each insulating cap further includes at least one fixing piece at an edge position thereof in a third direction intersecting with the first direction and the second direction, the at least one fixing piece and the electrode hole being on a same surface of the insulating cap, and the electrode hole is at a central position of each insulating cap in the third direction.

13. The battery pack as claimed in claim 12, wherein:

the at least one fixing piece includes a plurality of fixing pieces arranged in the first direction to correspond to the plurality of battery cells, and the binding frame is coupled to each of the plurality of fixing pieces while extending in the first direction and being in contact with the insulating cap of each battery cell of the plurality of battery cells.

14. The battery pack as claimed in claim 12, wherein:

the binding frame extends in the first direction and includes a first portion and a second portion bent with respect to each other, the first portion includes a coupling position coupled with the at least one fixing piece, and the second portion is bent from the first portion and protrudes toward the outside of the battery cell in the second direction.

15. The battery pack as claimed in claim 12, wherein the at least one fixing piece is integrally formed with a body of the insulating cap through insert injection molding.

16. The battery pack as claimed in claim 12, wherein each insulating cap further includes, together with the electrode hole, a bonding area at the central position thereof.

17. The battery pack as claimed in claim 16, wherein the electrode hole and the bonding area of the insulating cap are at different positions at the central position of each insulating cap.

18. The battery pack as claimed in claim 17, wherein:

the at least one fixing piece of each insulating cap includes a first fixing piece and a second fixing piece respectively at edge positions at both sides of each insulating cap in the third direction, the electrode hole and the bonding area of each insulating cap are between the first fixing piece and the second fixing piece, the electrode hole is at a position that is relatively closer to the first fixing piece, and the bonding area is at a position that is relatively closer to the second fixing piece.

19. The battery pack as claimed in claim 12, wherein:

the bus bar is at a position of the electrode hole of each insulating cap, the binding frame is at a position of the at least one fixing piece of each insulating cap, and the battery pack further comprises a circuit unit on the bus bar and the binding frame, the circuit unit being connected to the bus bar.

20. The battery pack as claimed in claim 1, wherein the insulating cap is directly on each of the pair of main surfaces, the side surfaces, the first surface, and the second surface.

21. The battery pack as claimed in claim 1, wherein:

the insulating cap includes a side portion on the outermost portion of each of the pair of main surfaces of each battery cell, the side portion of the insulating cap being directly on each of the pair of main surfaces of each battery cell, and the side portion of the insulating cap is in direct contact with the side portion of the insulating cap on an adjacent one of the plurality of battery cells, such that two adjacent ones of the plurality of battery cells include two insulating caps in direct contact with each other via the side portion, respectively.

* * * * *